United States Patent
Lee et al.

(10) Patent No.: US 7,827,243 B2
(45) Date of Patent: Nov. 2, 2010

(54) METHOD FOR TRANSMITTING FILE BASED ON MULTIPLEX FORWARDER

(75) Inventors: Soo-Jeon Lee, Daejon (KR); Jae-Hoon Kim, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 184 days.

(21) Appl. No.: 12/094,351

(22) PCT Filed: Nov. 21, 2006

(86) PCT No.: PCT/KR2006/004900
§ 371 (c)(1),
(2), (4) Date: May 20, 2008

(87) PCT Pub. No.: WO2007/058516
PCT Pub. Date: May 24, 2007

(65) Prior Publication Data
US 2008/0288592 A1 Nov. 20, 2008

(30) Foreign Application Priority Data
Nov. 21, 2005 (KR) ................ 10-2005-0111411

(51) Int. Cl.
*G06F 15/16* (2006.01)
(52) U.S. Cl. .............. 709/205; 709/231; 709/204; 709/228; 370/255; 370/312; 370/390
(58) Field of Classification Search ........... 709/204, 709/205, 228, 231; 370/255, 312, 390
See application file for complete search history.

(56) References Cited

U.S. PATENT DOCUMENTS 6,611,872 B1    8/2003    McCanne
(Continued)

FOREIGN PATENT DOCUMENTS
EP        1176767        1/2002
(Continued)

OTHER PUBLICATIONS

Soojeon Lee et al., "OMFVS: Overlay Multicast for File distributiom using Virutal Sources", 2005 IEEE IPCCC, pp. 249-256.
(Continued)

*Primary Examiner*—Wing F Chan
*Assistant Examiner*—Hitesh Patel
(74) *Attorney, Agent, or Firm*—Jae Y. Park; Kile Park Goekjian Reed & McManus PLLC

(57) ABSTRACT

Provided is a method for transmitting a file based on a multiplex forwarder using a session join time interval. The method includes the steps of: a) transmitting a session join request message to a source and joining to a corresponding session; b) when a member joins the session, transmitting a forwarder candidate list request message to the source and receiving a forwarder candidate list; c) skipping a specific member among members on the transmitted forwarder candidate list; and d) transmitting a forwarder request message to the members on the forwarder candidate list excluding the specific member, selecting a member permitting the request as a forwarder, and receiving a gift, which is a packet, from the selected forwarder.

9 Claims, 3 Drawing Sheets

U.S. PATENT DOCUMENTS

| | | | | |
|---|---|---|---|---|
| 6,973,081 | B1 * | 12/2005 | Patel | 370/390 |
| 7,400,596 | B1 * | 7/2008 | Robertson et al. | 370/312 |
| 2005/0152367 | A1 * | 7/2005 | Park et al. | 370/390 |
| 2005/0283447 | A1 * | 12/2005 | Xu et al. | 705/400 |
| 2006/0218288 | A1 * | 9/2006 | Umezawa et al. | 709/228 |

FOREIGN PATENT DOCUMENTS

| | | |
|---|---|---|
| EP | 1499066 | 1/2005 |
| EP | 1545059 | 6/2005 |
| KR | 100462406 | 5/2004 |
| KR | 1020040055448 | 6/2004 |
| KR | 1020050033062 | 4/2005 |

OTHER PUBLICATIONS

International Search Report PCT/KR2006/004900 Dated Feb. 26, 2007.

* cited by examiner

| ji | mai | (fseq$_i$) | (fseq$_{i+1}$−1) |
|---|---|---|---|
| 1 | 220.0.11.92 | 0 | 0 |
| 2 | 220.34.6.122 | 10 | 20 |
| 3 | 210.184.23.5 | 21 | 43 |
| . | . | . | . |
| . | . | . | . |
| . | . | . | . |
| 42 | 210.107.192.210 | 345 | 371 |

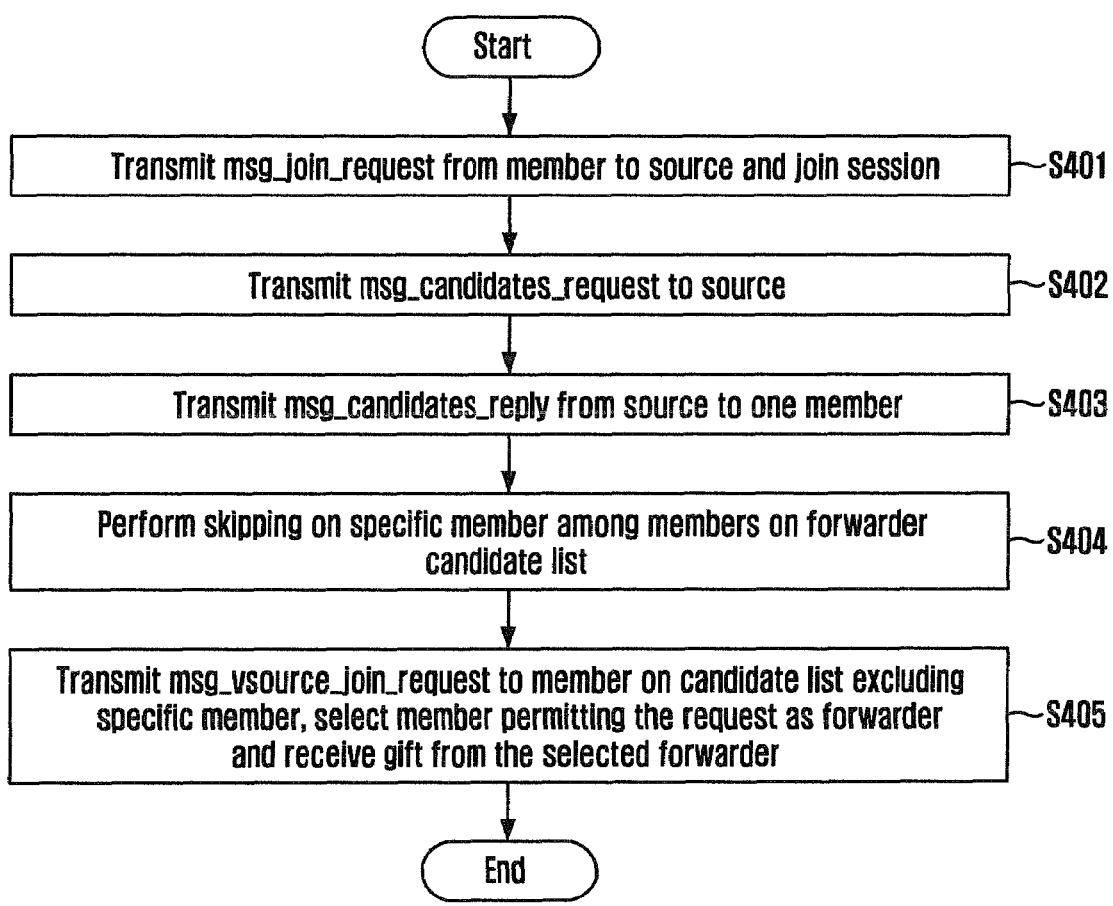

METHOD FOR TRANSMITTING FILE BASED ON MULTIPLEX FORWARDER

TECHNICAL FIELD

The present invention relates to a method for transmitting a file based on a multiplex forwarder using a session join time interval; and, more particularly, to a file transmitting method of a multiplex forwarder application layer multicast for improving performance in file transmission.

BACKGROUND ART

In the present invention, a source (S) means a one-to-many file transmission server and members 1, 2, 3, 4 and 5 will be described as a concept of a client such as a Personal Computer (PC) and a communication terminal.

Also, the present invention can be applied to all trees regardless of a structure of a tree, i.e., a forming method.

In application such as one-to-many file transmission, the present invention can reduce a load of data transmission based on a multicast. An IP multicast can support the multicast by most efficiently applying a network resource, but the IP multicast is not widely supported on the Internet in spite of ceaseless efforts.

Therefore, a research for realizing a multicast function in an application layer has been actively progressed. It is because there is a merit that an application layer multicast can be easily produced and allocated in comparison with the IP multicast.

When data are transmitted in the one-to-many application layer multicast, it is general to form a spanning tree which becomes a source of a root between the source and all receivers. However, this tree structure has two disadvantages.

First, efficiency that child nodes sense can decrease by their ancestor nodes having a bad network environment or computing performance. Second, each member should receive data from only one parent node. Accordingly, when a sudden error occurs in one of ancestor nodes, data reception can be failed.

The application layer multicast is a method for improving file transmission performance and methods such as ROMA, Splitstream, Bullet, Informed, Zhu and Overcast are suggested. The application layer multicast is divided into a single forwarder method and a multiplex forwarder method.

When data are transmitted based on the application layer multicast, the single forwarder method uses the tree structure, just as the IP multicast. In the application layer multicast technique using the tree, since all members in a session have only one forwarder parent node, the application layer multicast technique is classified into the single forwarder method. The single forwarder method includes Overcast and ROMA.

In the Overcast method, a member for joining the session is attached to a root of the tree. Subsequently, the member gradually moves from the root to a lower part of the tree within a range that a data reception rate does not decrease. Since many members are attached to the root of the tree, a bandwidth can be wasted. The data reception rate is measured by a reference of a time for receiving 10 KB data. Also, each member is attached to a child node of a better member by periodically monitoring other member. Performance of all sessions is improved by repeating the procedure. Also, reliability in data transmission can be realized by transmitting an acknowledgement (ACK).

The ROMA method means securing reliable transmission of the data by using a Forward Error Correction (FEC) coding method as well as a tree transmitting method. The ROMA method uses a forward-when-feasible technique instead of a store-and-forward technique.

That is, since all packets arriving at a reception buffer for a multicast are transmitted to all transmission buffers by the store-and-forward technique used in the ROMA method, performance of all sessions is limited by the slowest link on the tree. Although a limitless buffer can be used to solve the problem, there is a difficulty in adaptive reconfiguration of an overlay network.

In the forward-when-feasible technique used in the ROMA method, a packet arriving at the reception buffer is transmitted only to a transmission buffer capable of instantly receiving the packet. Therefore, the transmission buffer, which is already full of packets, does not need to receive a packet and bottlenecks that the lowest link on the tree limits performance of all sessions are not generated. Also, the ROMA method can have better performance than the IP unicast through the well-formed overlay tree.

The single forwarder method has several disadvantages. First, the reception rate of the data is lower in a lower part of the tree. Accordingly, each member should continuously monitor other member to be located in a good position on tree. Second, since each member depends only on the parent node, it is difficult to properly respond to failure of the node/link.

The multiplex forwarder method has been studied to overcome the disadvantages. The multiplex forwarder method includes Bullet, Informed delivery, Two-redundant multicast mesh, and Splitstream.

The Bullet method assumes data encoding based on the FEC and is formed based on an overlay mesh tree to overcome disadvantages of the conventional tree-based technique. In formation of the tree, all techniques can be used. That is, In the Bullet method, one new layer, i.e., a high-bandwidth mesh, on a predetermined tree structure is formed and performance is improved by transmitting data according to a peer to peer (P2P) method through a mesh. Each member should find other member having data which are necessary for each member to form a mesh. Therefore, information on which data each member has is exchanged between members.

In this procedure, a control overhead is generated and a summary is used in information exchange instead of expressing all of data information to reduce a packet size. Since the summary does not express exact state information, the data reception is always duplicated.

The Informed delivery method assumes data encoding based on FEC and is a technique for improving performance when large-capacity files are transmitted through a broadband communication network. The Informed delivery method focuses on cooperative transmission between members. Each host can recover the data by a little overhead based on the Digital fountain encoding approach technique.

Since the Informed delivery method uses the multiplex forwarder method, there is a problem that the data reception is duplicated. Accordingly, an algorithm for efficiently exchanging packet retention information between members in a corporative relation to decrease duplication rate is suggested.

In spite of the suggested information exchange algorithm, duplicated reception of the data is a still problem and the summary should be ceaselessly exchanged to acquire packet retention information of other member, thereby increasing the control overhead.

The Two-redundant multicast mesh method is a technique based on the mesh structure suggested to improve performance of the application layer multicast by writers of Zhu and uses the network coding. The Two-redundant multicast mesh method improves the performance of all sessions by making it possible to simultaneously have two forwarders. Also, it is considered as a pass bandwidth is more important than Round Trip Time (RTT).

The Splitstream method is a high-bandwidth application layer multicast technique and each members cooperatively forms a transmission topology. Many members on the tree are located in a terminal. The member located in the terminal does not perform forwarding rod and it causes disparity and performance deterioration of the session.

Therefore, a forest is used to disperse the forwarding rod. The forest is formed of a plurality of trees and an internal node of one tree becomes a terminal node of other tree. Also, a content to be transmitted is divided into many strips and each strip is transmitted through other tree. Each member joins all trees, if possible. Each member can overcome a failure through transmission using a multiplex tree by clarifying the number of the strip to be transmitted.

Although a reception time can be reduced by using the multiplex forwarder, several overheads can be generated in a procedure for selecting the multiplex forwarder. First, the duplicated reception of the packet can be generated. Second, retention data information of each member should be ceaselessly exchanged to find a forwarder having the data, which are not owned by each member, and it causes the control overhead.

Methods for transmitting the summary of the retention data information to reduce the control overhead, e.g., an Informed delivery method and a Bullet method, are used. However, since the limitation of expression that the summary has causes the duplicated reception of the packet, there is a problem that the considerable control overheads exist.

DISCLOSURE

Technical Problem

It is, therefore, an object of the present invention to provide a method for transmitting a file based on a multiplex forwarder using a session join time interval to have better transmission efficiency with less overhead in comparison with the case that a file is transmitted through a conventional application layer multicast technique when data are transmitted to a member joining a new session by using a parent node and at least one forwarder.

Other objects and advantages of the invention will be understood by the following description and become more apparent from the embodiments in accordance with the present invention, which are set forth hereinafter. It will be also apparent that objects and advantages of the invention can be embodied easily by the means defined in claims and combinations thereof.

Technical Solution

In accordance with one aspect of the present invention, there is provided a method for transmitting a file based on a multiplex forwarder using a session join time interval in a member, including the steps of: a) transmitting msg_join_request, which is a session join request message, to a source and joining to a corresponding session; b) when a member joins the session, transmitting msg_candidates_request, which is a forwarder candidate list request message, to the source and receiving a forwarder candidate list; c) skipping a specific member among members on the transmitted forwarder candidate list; d) transmitting msg_vsource_join_requestm, which is a forwarder request message, to the members on the forwarder candidate list excluding the specific member, selecting a member permitting the request to the forwarder, and receiving a gift, which is a packet, from the selected forwarder.

In accordance with another aspect of the present invention, there is provided a method for transmitting a file based on a multiplex forwarder using a session join time interval, including the steps of: a) receiving msg_join_request, which is a session join request message, from a member, creating an entry for the member and joining the member in a session; b) receiving msg_first_packet, which is a packet reception message including a sequence number of a first packet, from the member; c) receiving a message for notifying the first packet reception from the member, setting up a range of a gift or a packet sequence number, which is a data transmission range of other member joining before the member, based on the sequence number of the first packet and transmitting msg_present, which is a message including a packet sequence number range, to the other member joining right before the member; and d) receiving msg_candidates_request, which is a forwarder candidate list request message, from the member and transmitting the forwarder candidate list to the member.

ADVANTAGEOUS EFFECTS

The present invention can avoid control overhead and packet duplication by setting up forwarders as well as a parent node in a new member joining a session and forwarding a file, thereby reducing a reception time.

Since the present invention transmits data, which are different from each other, to a member, the data transmission is not duplicated. Also, since the present invention can acquire information on a data set, which can be provided by the forwarder, by a maximum/minimum value of a packet number in the inside of the set, the control overhead can be minimized.

When data transmission is performed only by a moving backward algorithm, the shorter a session join time interval is, the smaller a size of a gift is. Accordingly, the member requests the gift to much more forwarder candidates and the number of requests increases. It causes overhead in exchange of a control message. When the data are transmitted to the member joining a new session based on a parent node and at least one forwarder, the present invention can solve the above problem by performing a skipping procedure.

DESCRIPTION OF DRAWINGS

The above and other objects and features of the present invention will become apparent from the following description of the preferred embodiments given in conjunction with the accompanying drawings, in which:

FIG. 5 is a flowchart describing a method for transmitting a file based on a multiplex forwarder using a session join time interval in accordance with an embodiment of the present invention.

BEST MODE FOR THE INVENTION

Other objects and advantages of the present invention will become apparent from the following description of the embodiments with reference to the accompanying drawings. Therefore, those skilled in the art of the present invention can embody the technological concept and scope of the invention easily. In addition, if it is considered that detailed description on a related art may obscure the points of the present invention, the detailed description will not be provided herein. The preferred embodiments of the present invention will be described in detail hereinafter with reference to the attached drawings.

Figures 1, 2:
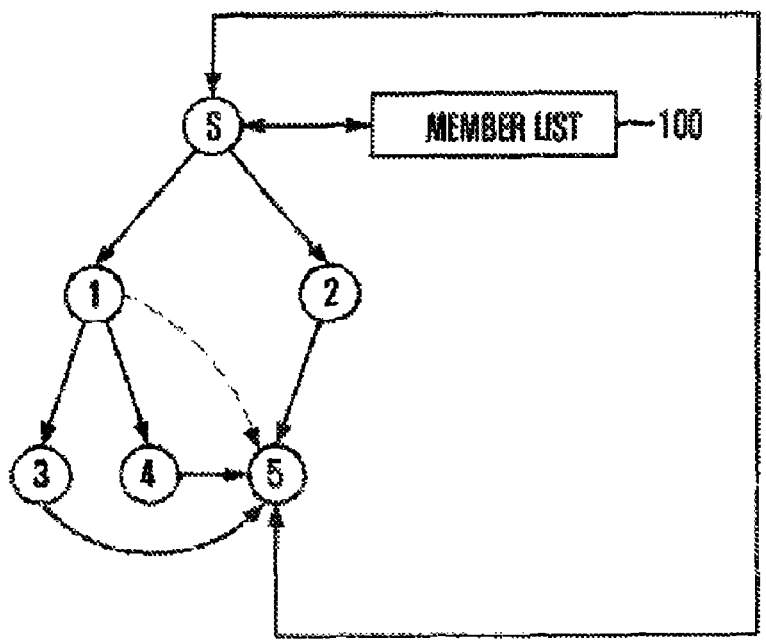
FIG. 1 shows an application layer multicast tree in accordance with an embodiment of the present invention.
FIG. 2 is a table showing a member list in accordance with an embodiment of the present invention.

FIG. 1 shows an application layer multicast tree in accordance with an embodiment of the present invention.

The application layer multicast tree of the present invention is a session including a source S, four members 1, 2, 3 and 4, and a new member 5 joining the session. The source S includes a member list 100. A formation of the tree does not affect the present invention. Also, the source S means a file transmission server and the members 1, 2, 3, 4 and 5 transmit/receive a file as a client.

The member list 100 is managed by the source S after the session starts. As shown in FIG. 2, the member list 100 includes a joining order ji of the member, an address mai of the member and a tuple having an entry of sequence numbers fseq$_i$ and fseq$_{i+1}$−1 of a packet that the member first receives from a parent node through a tree.

The source S encodes a file through generally used tornado codes and each member can decode the file by receiving different packets whose number is larger than a predetermined number. A member selects at least one forwarder among forwarder candidates provided from the source S and the member receives data from a parent node and a multiplex forwarder. The forwarder candidate becomes a part of the member joining the session before the forwarder candidate. One member designating a member as a forwarder is defined as a sink.

A predetermined member or sink, e.g., a member 5, subscribes a session and a procedure for selecting at least one forwarder is as follows.

When a predetermined member 5 transmits msg_join_request, which is a join request message, to the source S in order to join the session, the source S receives the message, creates an entry for the member 5 intending to join the session in the member list 100 and notifies join completion to the member 5 by transmitting msg_join_reply, which is a session join completion message.

Subsequently, the source S transmits data through a tree of a lower part. When the member 5 first receives a packet through the tree, the source S transmits a sequence number of the packet to the source S by transmitting msg_first_packet, which is a message for notifying first packet reception to the source S.

The source S receiving the message for notifying the first packet reception sets up a gift range, i.e., a range of a packet sequence number, which is a data transmission range of the member 4 joining right before the member 5 based on the sequence number of the first packet, and transmits the message to the member 4 through msg_present, which is a gift message.

A procedure that the member 5 selects at least one forwarder is as follows.

When the member 5 joins the session, the member 5 transmits msg_candidates_request, which is a message for requesting a forwarder candidate list to the source S. The msg_candidates_reques clarifies the number of the forwarder candidate desired by the member 5. The maximum number of the forwarder that one member 5 can have is limited as δ, e.g., 3, and specific values of δ are different according to a network environment of each member.

Subsequently, the source S receiving the msg_candidates_request transmits msg_candidates_reply, which includes a forwarder candidate list arranged in a joining order in the member list 100 to the member 5.

The member 5 receiving the forwarder candidate list requests gift transmission by transmitting msg_vsource_join_request, which is a forwarder request message, to the members 1, 2, 3 and 4. The forwarders 1, 2, 3 and 4 transmit information on whether the gift is to be transmitted or not through msg_vsource_join_reply, which is a gift transmission response message. When the transmission is permitted, the gift is transmitted. The member 5 selects members transmitting the gift as a forwarder.

Also, the members 1, 3 and 4 respond to the gift request of the member 5. However, since the member 2 is a parent node of the member 5, the member 2 does not respond. That is, the member 5 selects the members 1, 3 and 4 as a forwarder.

The present invention suggests two forwarder selection algorithms, i.e., a moving backward algorithm and a moving backward with skipping algorithm.

Figure 3:
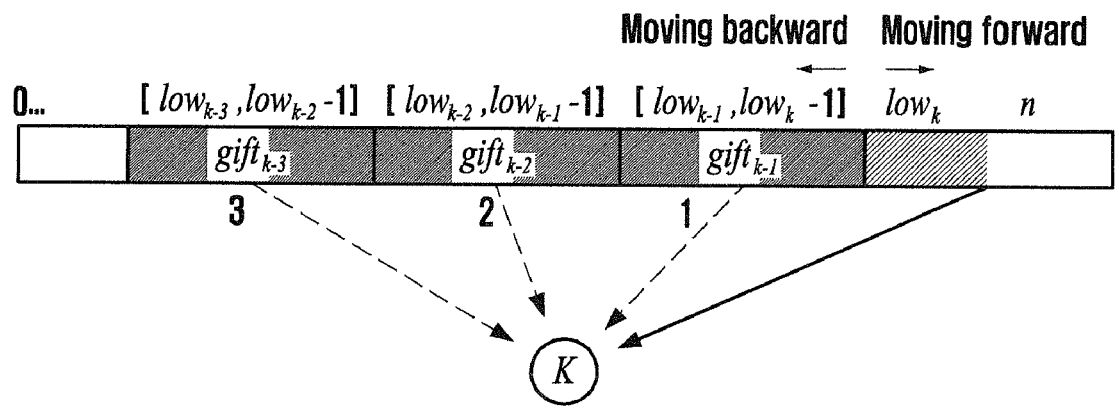
FIG. 3 shows a file transmitting procedure based on a multiplex forwarder in accordance with an embodiment of the present invention.

In case of the moving backward algorithm, when the member transmits the msg_vsource_join_request to the forwarder candidates, the member requests the forwarder in backward order of a session joining order to select the forwarder. That is, as shown in FIG. 3, the member preferentially selects a forwarder of a joining order, which is closer to the member. Since the order for selecting the forwarder is a backward order of the member join, it is called as the moving backward algorithm. A gift of a K$^{th}$ member exists between fseq$_k$ and fseq$_{k+1}$−1. In this case, the gift between forwarders in an encoding cycle is a relatively prime. Therefore, when a proper stretch factor is used in a Forward Error Correction (FEC) coding method, packet reception is not duplicated.

In the moving backward algorithm, when a sink receives all gifts from a specific forwarder, msg_exhaust, i.e., an exhaust message, is transmitted to the specific forwarder. The forwarder receiving the message does not transmit the gift to the sink and the sink requests the gift to a next forwarder by moving backward. This process is repeated. When the sink uses currently owned all forwarders, a procedure for transmitting the msg_candidates_request to the source S is repeated. When the sink receives enough packets for file recovery and withdraws from the session, the sink transmits msg_remove, which is a removal message, to all forwarders.

In the moving backward with skipping algorithm based on reverse, specific forwarder candidates are intentionally excluded from a selected object. A gift range of a predetermined member is [fseq$_k$, fseq$_{k+\tau}$−1] and τ is set up as a value larger than 1. A duplicated part exists in a gift of a k−τ+1$^{th}$ member to a k+τ−1$^{th}$ member. Therefore, the k$^{th}$ member receives a gift from k−τ*h$^{th}$ members to prevent duplicated reception of the gift and h is larger than 1.

Figure 4:
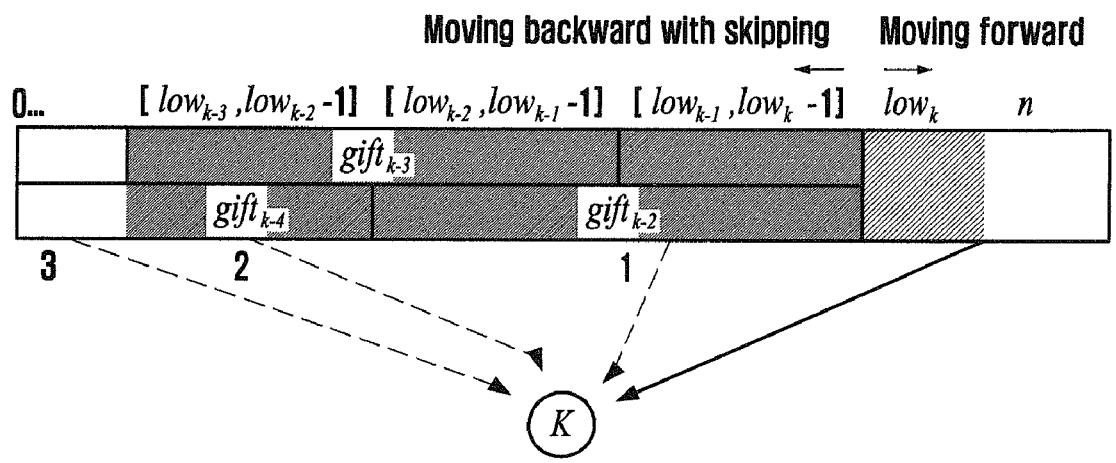
FIG. 4 shows a file transmitting procedure based on the multiplex forwarder using a session join time interval.

FIG. 4 shows a moving backward with skipping algorithm when τ=2. A reason that skipping is performed is as follows.

When data transmission is performed only by a moving backward algorithm, the shorter a session join time interval is, the smaller a size of a gift is. Accordingly, the member requests the gift to much more forwarder candidates and the number of requests increases. It causes overhead in exchange of a control message. Therefore, a method for increasing a size of a gift required when a member is operated as a forwarder by skipping and for reducing the number of gift requests is efficient.

A member receives a packet from a parent node in a direction that the sequence number increases commonly in two forwarder selection algorithms and this procedure is called as a moving forward algorithm. The sequence number increases by n−1 and receives a feedback as 0. That is, moving forward and moving backward are simultaneously performed to reduce a file reception time in the present invention.

FIG. 5 is a flowchart describing a method for transmitting a file based on a multiplex forwarder using a session join time interval in accordance with an embodiment of the present invention.

A member 5 transmits msg_join_request, which is a session join request message, to a source and joins a corresponding session at step S401.

That is, a predetermined sink, which is the member 5, transmits msg_join_request to the source S.

Subsequently, the source S receives the msg_join_request from the member 5, creates an entry on the member 5 in the member list 100 and transmits the msg_join_reply to the member 5.

The member 5 receives a first packet from the source S through a tree and transmits msg_first_packet, which is a packet reception message, including a sequence number of the packet to the source S.

The source S receiving the message for notifying the first packet reception sets up a range of a gift or a packet sequence number, which is a data transmission range of the member 4 joining before the source S, based on the sequence number of the first packet and transmits the range of the gift to the member 4 through the msg_present.

A procedure that the member 5 selects at least one forwarder and receives the gift, i.e., a file, from a corresponding forwarder is as follows.

When the member 5 joins the session, the member 5 transmits the msg_candidates_request to the source S at step S402. The msg_candidates_request clarifies the number of the forwarder candidate desired by the member 5.

The source S receiving the msg_candidates_request transmits the msg_candidates_reply including the forwarder candidate list arranged in the joining order in the member list 100 to the member 5 at step S403.

The member 5 performs skipping on a specific member among members on the forwarder candidate list at step S404. That is, the $k^{th}$ member receives a gift from k−τ*$h^{th}$ members. τ is an integer lager than 1 and h is an integer equal to or larger than 1.

Subsequently, the member 5 transmits the msg_vsource_join_request to the member on the candidate list excluding the specific member, selects a member permitting the request as a forwarder and receives the gift, i.e., the packet, from the selected forwarder at step S405. The forwarder request messages are transmitted to the members on the list in a reverse order of session join.

That is, the member 5 first transmits the forwarder request message to the member 4 and receives the gift.

When the member 5 receives all gifts, i.e., the files to receive, the member 5 transmits the msg_exhaust and requests gift interruption from the member 4.

Subsequently, the member 5 transmits the forwarder request message to the forwarder, i.e., the member 3, and requests gifts, which are not transmitted.

The member 5 receives all packets by repeating the procedure.

When the sink uses currently owned all forwarders, a procedure for transmitting the msg_candidates_request to the source S is repeated. When the sink receives enough packets for file recovery and withdraws from the session, the sink transmits the msg_remove to all forwarders.

As described above, the technology of the present invention can be realized as a program and stored in a computer-readable recording medium, such as CD-ROM, RAM, ROM, a floppy disk, a hard disk and a magneto-optical disk. Since the process can be easily implemented by those skilled in the art, further description will not be provided herein.

The present application contains subject matter related to Korean patent application No. 2005-0111411, filed in the Korean Intellectual Property Office on Nov. 21, 2005, the entire contents of which are incorporated herein by reference.

While the present invention has been described with respect to certain preferred embodiments, it will be apparent to those skilled in the art that various changes and modifications may be made without departing from the scope of the invention as defined in the following claims.

What is claimed is:

1. A method for transmitting a file based on multiplex forwarders on an overlay multicast delivery tree using a session join time interval between members, wherein a session includes a plurality of members and a source, the method comprising the steps of:

a) transmitting msg_join_request, which is a session join request message, from a receiver that has not joined the session to the source, and joining the receiver to the session by making the receiver the kth member of the session;

b) after the kth member joins the session, transmitting msg_candidates_request, which is a forwarder candidate list request message, from the kth member to the source and receiving at the kth member a forwarder candidate list including a sequence number of the first packet that each forwarder candidate received from a parent in the overlay multicast delivery tree;

c) the kth member skipping specific members among members on the received forwarder candidate list; and d) transmitting msg vsource join request, which is a forwarder request message, from the kth member to the other members on the forwarder candidate list excluding the specific members, selecting at the kth member members permitting the request as forwarders, and receiving at the kth member a gift, which is a specific set of data packets, from each of the selected forwarders, wherein the msg_candidates_request states the number of the forwarder candidate desired by the member joining the session.

2. The method as recited in claim 1, wherein the step a) includes:

A1) transmitting the msg_join_request from the kth member to the source;

A2) receiving at the kth member a session join completion message from the source; and A3) receiving at the kth member a first packet from a parent of the kth member in the overlay multicast delivery tree and transmitting msg_first_packet, which is a packet reception message including a sequence number of the first packet, from the kth member to the source.

3. The method as recited in claim 1, wherein in the step b), msg_candidates_reply, which is a list message including a forwarder candidate list arranged in a joining order, is received at the kth member.

4. The method as recited in claim 1, wherein in the step c), further comprises transmitting gifts from k−τ*$h^{th}$ members to the kth member, where τ is an integer lager than 1 and h is an integer not smaller than 1.

5. The method as recited in claim 1, wherein in the step d), the forwarder request messages are transmitted in a reverse order of session join.

6. The method as recited in claim 5, wherein the step d) includes the steps of:
   d1) preferentially transmitting the forwarder request message from the kth member to the k–τ$^{th}$ member joining the session and receiving the gift, where τ is an integer larger than 1;
   d2) when the k–τ$^{th}$ member joining the session does not have the gift to be transmitted, transmitting msg_exhaust, which is an exhaust message, from the kth member and interrupting the receiving the gift; and
   d3) repeating the procedure for k–τ*h$^{th}$ members for all integers h larger than 1 and receiving at the kth member all packets desired to receive.

7. The method as recited in claim 6, further comprising the steps of:
   e) when a sufficient number of packets has not been received even after trying all k–τ*h forwarders on the forwarder list, transmitting the msg_candidates_request from the kth member to the source, receiving at the kth member a new forwarder list corresponding thereto and receiving at the kth member the sufficient number of packets for file recovery; and
   f) receiving at the kth member the sufficient number of packets based on the transmitted new forwarder list and transmitting msg_remove, which is a remove message, from kth member to all forwarders who are delivering their gifts to the member in withdrawal from the session.

8. A method for transmitting a file based on multiplex forwarders on an overlay multicast delivery tree using a session join time interval between each member, wherein the session includes a plurality of members and a source, the method comprising the steps of:
   a) receiving at the source msg_join_request, which is a session join request message, from a receiver who has not joined the session and is about to join the session to become a member of the session, joining at the source the receiver as the kth member in a session and creating at the source an entry for the kth member in a member list;
   b) receiving msg_first_packet, which is a packet reception message including a sequence number identifying a particular first packet received by the parent of the kth member in the delivery tree, from the kth member;
   c) setting up at the source a range of a gift, i.e., a packet sequence number range, which is a data transmission range of k–τ*h$^{th}$ members of the plurality of members, based on msg_first_packets received from the k–τ*h$^{th}$ members, and transmitting from the source msg_present, which is a message including a packet sequence number range, to the kth member, where T and h are integers larger than 1; and
   d) receiving at the source msg_candidates_request, which is a forwarder candidate list request message, from the kth member and transmitting from the source the forwarder candidate list to the kth member,
   wherein the msg_candidates_request states the number of the forwarder candidates desired by the kth member.

9. The method as recited in claim 8, wherein in the step d), msg_candidates_reply, which is a list message including a forwarder candidate list arranged in a joining order, is transmitted.

* * * * *